US011963848B2

(12) United States Patent
Cerri

(10) Patent No.: US 11,963,848 B2
(45) Date of Patent: Apr. 23, 2024

(54) IMPACTOR PLATFORM ALLOWING FREEFALL UPON IMPACT

(71) Applicant: George Mason University, Fairfax, VA (US)

(72) Inventor: David Derickson Cerri, Catharpin, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 750 days.

(21) Appl. No.: 17/106,836

(22) Filed: Nov. 30, 2020

(65) Prior Publication Data

US 2021/0196441 A1 Jul. 1, 2021

Related U.S. Application Data

(60) Provisional application No. 62/955,874, filed on Dec. 31, 2019.

(51) Int. Cl.
*A61D 3/00* (2006.01)

(52) U.S. Cl.
CPC .......................... *A61D 3/00* (2013.01)

(58) Field of Classification Search
CPC .......... A61D 3/00; G01L 5/0052; G01N 3/30; G01N 3/303; G01N 2203/001; G01N 2203/0039; A01K 2267/03; A22B 3/02
See application file for complete search history.

(56) References Cited

U.S. PATENT DOCUMENTS 3,887,033 A * 6/1975 Breinig .................... E06C 9/10 182/86
2019/0242766 A1* 8/2019 Yang .................... A61B 5/1036

* cited by examiner

*Primary Examiner* — Eric S. McCall
*Assistant Examiner* — Timothy P Graves
(74) *Attorney, Agent, or Firm* — WC&F IP

(57) ABSTRACT

Devices and systems are disclosed which reduce compressional forces and allows for the induction of mild CCI injuries. An exemplary device features a resettable fall-away platform which allows for ultra-mild injuries to be induced on mice that are under light anesthesia. The result is injuries which do not produce long periods of unconsciousness, do not cause compressive injury and cause no increase in time-to-righting over control mice.

15 Claims, 8 Drawing Sheets

IMPACTOR PLATFORM ALLOWING FREEFALL UPON IMPACT

CROSS-REFERENCE TO RELATED APPLICATIONS

This application claims the benefit of U.S. Provisional Patent Application No. 62/955,874, filed Dec. 31, 2019. This application is incorporated herein by reference.

FIELD OF INVENTION

The invention generally relates to equipment usable for producing reproducible injuries to test subjects, and, more specifically to platforms capable of freefall upon impact.

BACKGROUND

Traumatic Brain Injuries (TBIs) are a health crisis with millions of people suffering injuries each year. The majority of TBIs are mild injuries (mTBIs) which often produce no period of unconsciousness and no gross damage to the brain or skull. A range of TBI animal models exist but many of them produce injuries too severe to characterize as mild. One particular brain injury induction method commonly used in the field is Controlled Cortical Impact (CCI) devices. CCI devices use electromagnetic coils and a computer delivery system to ensure that the same force is applied consistently for all injuries. Many of these machines have different interchangeable diameter impact tips that can be used to simulate different types and severities of injuries. These devices have high reproducibility but tend to induce severe injuries and have poor adjustability for reducing the severity of the impact, in particular the forces that result from the specimen tissue being compressed between the impact tip and the platform.

Alternatives exist to CCI devices which are meant to produce less severe injuries than CCI devices, but they have poor reproducibility. According to the Marmarou method, the anesthetized mouse is placed on a platform under a tube, through which a weight is dropped. A drawback of early weight-drop methods like the Marmarou reference is the mouse's head is placed against a hard surface prior to impact, resulting in large compressive forces acting on the skull.

According to another method, called the Kane method, the anesthetized mouse is placed on a thin sheet of foil which is fixed in such a way as to be held taut enough to support the mouse, but not so tightly that it tears the foil. A slit has been cut in the paper/foil to weaken it, so that it will tear easily when the impactor strikes the mouse, allowing the mouse to fall through. A new sheet of foil must be set up for every trial, and it's impossible to accurately replicate parameters from one trial to the next. Yet another approach to minimizing compression of the mouse tissue resulting from the platform's reactive forces is the placement of a gel pad between the mouse and the hard platform. These additions to the weight drop model increase translation but, the model still suffers in its ability to produce concussive low-anesthesia injuries. There is also the potential for replication issues using weight drop devices as most labs build their own devices, causing variation in a number of factors including where the weight impacts the skull.

A craniotomy can be performed prior to CCI allowing for the machine to directly impact brain tissue. The effect of craniotomy alone produces an equivalent amount of inflammatory protein release as the injury that follows. This has allowed researchers to know with great accuracy what area of the brain is being impacted; however, this is not translatable to the majority of TBI cases in humans. In human TBI, the skull is thought to absorb a fraction of the force of the injury and diffuse the injury throughout the brain, resulting in decreased damage to the focal point. Through removing the skull and directly impacting the brain of the mouse, multiple parts of the normal human TBI experience are taken away. The results of these studies offer good insight into damage from penetrating injuries, as well as piercing blast damage, but are not considered to be good substitutes for mild TBI, which comprises over 75% of all TBI cases.

In recent years, labs with CCI devices have sought to use the machine on a closed-skull to better replicate human TBI. When this is done with the mouse's head resting against a hard object, such as a stereotaxic base, the skull is compressed. This exacerbates injury pathology and makes it impossible to produce an injury like that of a concussion in humans. Adaptations including placing the mouse on a soft platform and using a silicon impactor tip have worked to reduce compression. Nonetheless, injuries induced using closed-head CCI devices often impact mice under deep anesthesia and have difficulty producing concussive injuries.

Instruments capable of simulating mTBI with high reproducibility are needed by institutions of higher education, corporations, and military bodies which do research on TBI relating to (but not limited to) memory and cognitive deficits resulting from TBI, therapeutic and pharmacological interventions (pre and post-impact), development of protective gear and materials, and more.

SUMMARY

Exemplary devices and systems disclosed herein reduce compressional forces and allows for the induction of mild CCI injuries. An exemplary device features a resettable fall-away platform which allows for ultra-mild injuries to be induced on mice that are under light anesthesia. The result is injuries which do not produce long periods of unconsciousness and cause no increase in time-to-righting over control mice. The combination of low-anesthesia and non-compressive forces makes this method highly translational to concussive human injuries. As current research indicates long-term behavioral and neuronal pathologies following multiple mild injuries, the devices and methods disclosed herein should be useful in these studies.

Exemplary embodiments disclosed herein disclose a novel adaptation to CCI devices that allows for the induction of ultra-mild injuries that mimic human mTBI. In an exemplary apparatus used according to an exemplary procedure, the mouse is placed on an elevated platform which falls away as the impactor hits the mouse's head. A sensor (e.g., light-sensor) placed on the tip of the impactor is used to signal the platform to fall (i.e., drop, descend) immediately when the CCI device makes contact. This device and procedure produce a time-to-righting reflex no higher than the time-to-right to recover from anesthesia alone. Furthermore, they produce significantly less GFAP than CCI injuries performed without the novel device in use. This new device is easy-to-build and add to any CCI research lab to translationally study mild injuries. The device may be considered an adaptation or accessory to existing CCI devices. This facilitates both basic and applied murine research into mild TBI.

One embodiment of device comprises a platform and an adjustable magnetic flux apparatus to hold the platform in place. In a different embodiment, a secondary solenoid, triggered by activation of the impactor solenoid, forces the platform to fall. In yet another embodiment, a secondary solenoid's plunger holds the platform in place—either directly, or through means of linkage—until impact.

DETAILED DESCRIPTION

Figure 1:
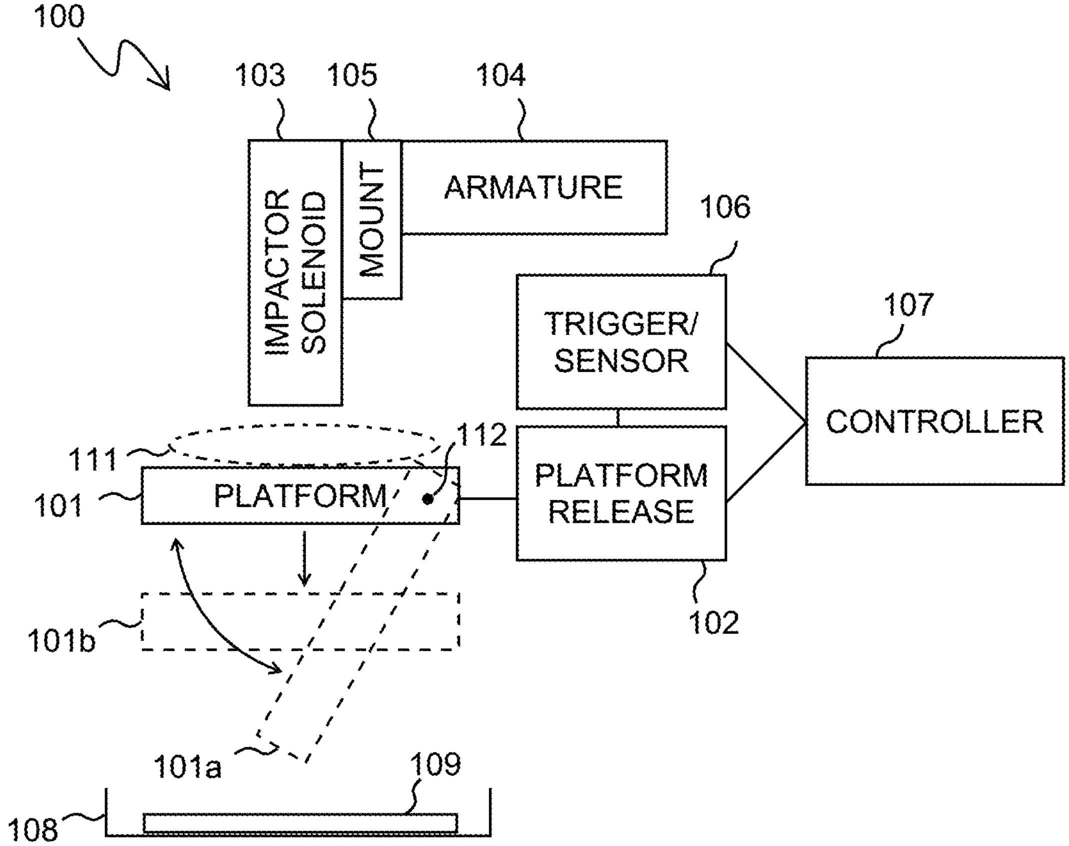
FIG. 1 is a schematic of a system for inducing mild traumatic brain injuries (mTBI) or other injuries in a subject in an adjustable and reproducible manner.

FIG. 1 shows a system 100 comprising a platform 101, a platform release 102, an impactor solenoid 103, an armature 104, a mount 105 for removable attachment of the impactor solenoid 103 to the armature 104, a trigger (e.g., a sensor) 106, and a controller 107. The mount 105 may be an integral part of the armature 104.

FIG. 1 is applicable to variety of variations and alternative embodiments disclosed herein, and elements of FIG. 1 will be referred to frequently throughout the following discussion alongside reference to other figures.

The platform 101 is configured for supporting a subject 111, e.g., a mouse or other laboratory animal used in simulating the effects of injuries to humans. The impactor solenoid 103 is configured to contact the subject 111 to cause an injury. A suitable impactor solenoid for mouse models of Traumatic Brain Injury (TBI) is the Leica Impact One impactor (Model #39463920). The platform release 102 is configured to cause at least one side of the platform to drop/fall upon satisfaction of one or more predetermined conditions. These conditions may include but are not limited to: actuation/firing of the impactor solenoid 103 (resulting in extension of a plunger of the solenoid), breaking of a sight line of a sensor by the plunger of the impactor solenoid, and any force application to the platform (e.g., a force transfer through a subject atop the platform) exceeding a predetermined threshold supplied by a platform release 102. Platform position 101*a* shows a drop position resulting from the drop of one side of the platform 101, specifically the side at page left in the figure. Such a drop may be achieved by rotation of the platform about a hinge with axis of rotation 112. Platform position 101*b* shows a drop position resulting from a drop of the entire platform 101, amounting to a vertical translation of the platform 101. Alternative embodiments may use these or other drop positions. No matter the drop position, the effect for all of them is to permit gravity to move the subject 111, in particular the locale of the subject impacted by the impactor solenoid 103, away (downward) from the impactor solenoid 103. In effect a freefall condition or near freefall condition is produced for the subject's tissue which is impacted, if not an entirety of the subject tissue.

The system 100 may include a receptacle 108 with a catchment area for receiving and catching the subject 111 after the platform 101 drops. Various types, shapes, and thicknesses of dampener 109, e.g. foam, may be placed in the receptacle to cushion the mouse's fall. The catchment area and platform are easily cleaned and sanitized.

Figure 2A:
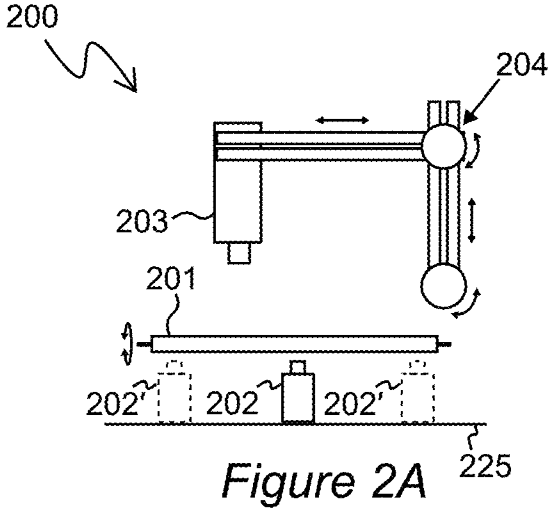
FIG. 2A is a diagram of an exemplary system from a side view.
Figure 2B:
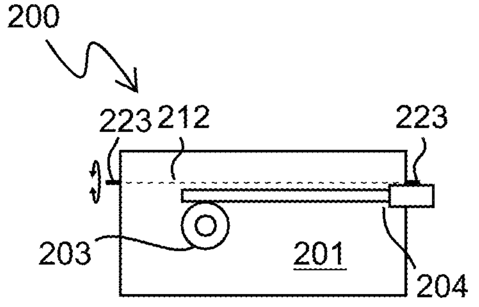
FIG. 2B is a diagram of the exemplary system from a top view.

FIGS. 2A and 2B show a more specific embodiment of a system 200 that generally corresponds with the schematic of system 100 in FIG. 1. FIG. 2A is a side view whereas FIG. 2B is a top view.

The platform 201/101 allows the subject (e.g., an anesthetized mouse) to be firmly supported on a top surface of the platform 201/101. However, the platform is immediately released upon impact with the subject by the impactor 203/103. If desired, the platform's release may be timed to occur a moment before or a moment after the impactor 203/103 makes contact with the subject. The armature 204/104 holds the impactor 203/103 at a configurable position above the platform 201/101. Two-headed arrows in FIG. 2A show a variety of adjustments of which the armature 204/104 is capable to permit positioning the impactor 203/103 at any of a variety of positions in three-dimensional space above platform 201/101 and at any angle in three dimensional space with respect to a subject resting atop the platform 201/101.

The platform 201/101 may be made of polycarbonate, polyoxymethylene, acrylic plastic, aluminum, steel, stainless steel, or other suitably rigid materials capable of resisting significant internal deflection when subject to impact forces from impactors. Many metals and thermoplastics are suitable.

The platform 201/101 is held in place by a preset amount of force. The force sustaining the platform in a level position is either removed or overcome by an opposing force to cause or permit the platform to assume a drop position, e.g. positions 101*a* or 101*b*.

The axis of rotation 212/112 may be provided by a hinge 223. An exemplary hinge may comprise screws protruding from the sides of the base, which pass through holes in opposite ends of the platform. An alternative hinge comprises miniature ball bearings. Yet another alternative hinge is precision dowel pins in sleeve bearings. Other hinge configuration may occur to those of skill in the art in view of this disclosure. The hinge (or hinges) 223 may be adjustable in their position and/or in their support of the platform. As the platform 201/101 falls to position 101*a*, it undergoes a radius of rotation on its hinge(s) 223. Rotation is an important aspect of TBI research, as it relates to accurate modeling of human TBI. The subject's radius of rotation on impact can be adjusted by varying the distance between the point of impact, and the platform's axis of rotation. The closer the point of impact to the axis of rotation, the smaller the radius—the farther from the axis, the greater the radius. The dampener 109 may be inclined or otherwise shaped to force additional rotation after impact. An additional feature in some embodiments is a device allowing for the height of the platform relative to the base to be adjustable, allowing the mouse to drop a preselected distance in different experiments.

The hinge 223 may have a friction element that resists torque below a predetermined threshold. The amount of resistance supplied by the hinge itself may be adjustable, e.g., using a set screw. Alternatively the hinge may provide no significant resistance to rotation of the platform whatsoever. Other arrangements by which the platform 201/101 is held in place are possible and may be independent or integral with the platform release 202/102, discussed in greater detail below. As brief introduction, FIG. 2A shows as non-limiting examples two alternative arrangements of a platform release. According to a first arrangement a single platform solenoid 202 is arranged at or near a centerpoint along an edge of the platform 202. According to a second arrangement multiple (e.g., two or more) platform solenoids 202' are positioned along an edge of the platform 202.

To provide a tabletop support for the various system components, a baseplate 225 may be used. The baseplate 225 may be, for example, sourced from a commercially available stereotaxic frame. Customs baseplates are of course a suitable alternative. Commercially available micro-adjusters may also be used for positioning components such as hinges or the platform release 102. The armature 204/104 may also be commercially sourced from companies making stereotax frames systems and attached to the baseplate 225 with a bracket (of e.g. aluminum) which holds the armature 204/104 in a vertical orientation as in FIG. 2A. The impactor solenoid 203/103 is attached to the end of the armature 204/104 by an adjustable clamp or similar mounting device 105. This arrangement orients the impactor 203/103 vertically, and allows it to be positioned accurately along X, Y, and Z axes. The fixture attaching the armature to the baseplate allows the entire armature to be rotated and tilted at any angle, allowing for impaction of the subject from almost any direction above the target area.

FIGS. 3A-3C, 4A-4C, and 5A-5C illustrate alternative embodiments for platform release 102 and trigger 106. The platform release 102 is configured to cause at least one side of the platform 101 to drop/fall upon satisfaction of one or more predetermined conditions. The platform release may be configured in at least two different configurations. According to a first group of embodiments, the platform release imparts an impact force on the platform that exceeds a preset force holding the platform in place in an initial position, e.g., a level position. The result is to cause to displacement of at least one side of the platform such that any subject atop the platform moves under gravitation force downward and therefore away from the impactor solenoid. The force required for release is as replicable as possible from one trial to the next, overcoming a major drawback of alternative methods in the art. According to a second group of embodiments, the platform release provides a supporting force to the platform to maintain it in the initial (e.g., level) position. When triggered, the platform release 102 retracts, withdraws, or otherwise removes the support force, leaving the platform 101 to fall under at least the force of gravity. The two groups of platform release can in fact be combined in a single embodiment. That is to say, a platform release may include both a component which supports the platform in the starting position as well as a component which forces the platform into a drop position.

Figure 3A:
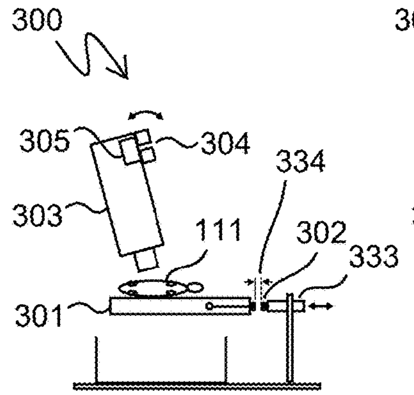
FIGS. 3A-3C show an exemplary procedure with a first embodiment. The three figures show three sequential moments in time for the same system. The events in FIGS. 3B and 3C may occur in sequence or virtually simultaneously.
Figure 3B:
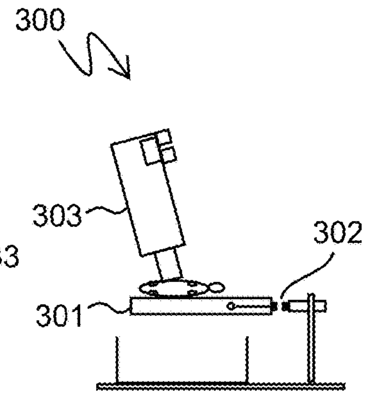
Figure 3C:
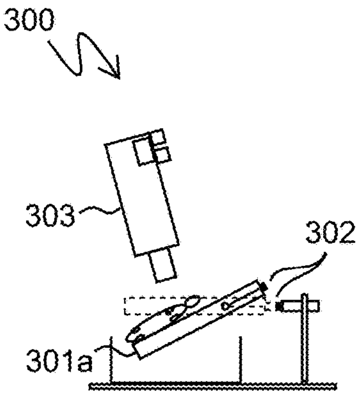

FIGS. 3A-3C show an exemplary embodiment in which a system 300 has a platform release 302/102 that comprises at least one pair of magnets or else at least one magnet paired with a ferromagnetic material. At least one element of the pair is part of or attached to the platform, and the other element of the pair is held in a fixed position adjacent the platform by e.g. a micro-adjuster 333. According to this configuration, magnetic flux holds the platform 301 in its starting position. The use of magnetic flux eliminates possible variations resulting from physical contact due to friction or stick-slip. The strength of the flux is adjustable using the micro-motion adjuster 333 to vary the distance between the magnets and ferrous part on the platform (see double headed arrow adjacent to element 333 in FIG. 3A). The ferrous part may be a steel screw, for instance. In this case the platform 301 is kept level by magnetic flux between steel screws on the back edge of the platform magnets (e.g., rare earth magnets or some other type of magnet). The magnets are attached to one of the micro-adjusters 333 located behind the platform. Adjusting the distance 334 between magnets and platform allows the platform to be held level with predetermined and replicable strength that may be varied depending on the subject type and injury type (e.g., mTBI versus TBI). A platform release 302 using a magnetic force to hold the platform in its starting position may but needn't necessarily be paired with any supplemental source of force besides the impactor solenoid 303/103. When the impactor solenoid 303/103 strikes the subject 111 (FIG. 3B), the force passed through the subject to the platform 301/101 overcomes the holding force from the magnetic arrangement, causing the platform 301/303 to rotate to position 301*a*/101*a* (FIG. 3C) or descend to position 101*b* (depending on whether the platform is hinged or situated on a vertical slide). The impactor solenoid 303/103 and/or the magnetic arrangement is configured or configurable to ensure sufficient displacement of the platform 301/101 relative to the magnet to break the magnetic hold. For sake of illustration, FIGS. 3A-3C also show a degree of freedom by which the solenoid 303/103 is rotatable that was not clearly visible from the views of FIGS. 2A and 2B. A mount 305/105, such as a clasp or clip, is shown holding the solenoid 303/103 to the armature 304/104.

Figure 4A:
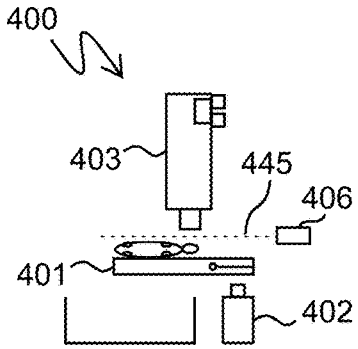
FIGS. 4A-4C show an exemplary procedure with a second embodiment. The three figures show three sequential moments in time for the same system. The events in FIGS. 4B and 4C may occur in sequence or virtually simultaneously.
Figure 4B:
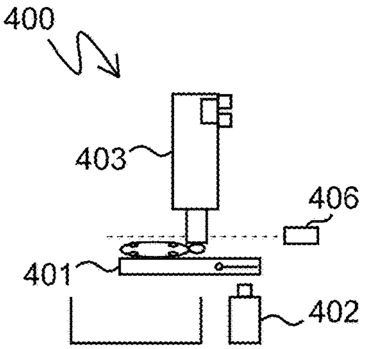
Figure 4C:
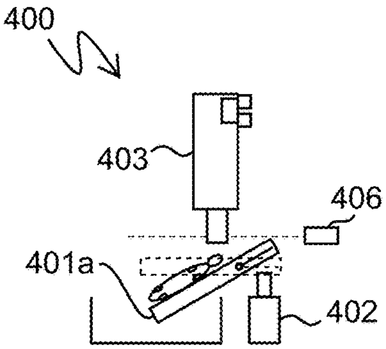

FIGS. 4A-4C show an exemplary embodiment in which a system 400 comprises a platform release 402/102 that comprises at least one secondary solenoid, that is a solenoid other than the impactor solenoid 303/103. Magnetic hold types of platform release can present some difficult for especially small impact depths. When using very small impact depths, such as when simulating some forms of mild TBI, the impact force imparted to the platform held in place by magnetic flux may sometimes be insufficient for platform release to occur. According to an alternative embodiment, a secondary solenoid 402, or "platform solenoid", forcefully releases the platform. When unenergized, as in FIG. 4A, the solenoid 402 applies no force to the platform 401/101. When energized by the trigger 406/106, the solenoid 402 forces the platform to release (FIG. 4C) and fall to position 401*a*/101*a*. The platform solenoid (e.g., ZYE1-0530, 12 VDC, 1A) is positioned under an edge of the platform 401/101, and when energized, impacts the platform 401/101 from below, forcing its release from the holding power of e.g. the magnetic flux or hinge friction (not shown in FIGS. 4A-4C; magnetic flux hold is shown in FIGS. 3A-3C and may be used in conjunction with the features of FIGS. 4A-4C). Hinge placement is such that pushing up on the platform's back edge causes the platform's opposite edge to drop.

For some platform release variants described above, such as a magnetic hold or friction hinge configuration, the only trigger required for release is actuation of the impactor solenoid. However, for other platform release variants described above, a distinct trigger 106 is required for time activation of the platform release 102 with activation of the impactor solenoid 103. According to the embodiment 400 in FIGS. 4A-4C, for example, the platform solenoid 402 may be directly triggered by actuation of the primary impactor solenoid 403. A hardwired signal may be emitted by the impactor solenoid 403 upon activation which is received by the trigger 106, which in turn initiates the platform release 402. However, this configuration is not always ideal for commercially available impactor solenoids 103 which are often standalone instruments. In this case the trigger 106 may be a sensor 406 that is able to passively detect a change associated with the impactor solenoid firing. So as not to effect in any way the force characteristics of the primary solenoid, the trigger signal is generated in a manner completely independent of the primary solenoid and its electronics. An exemplary trigger 406 is an externally powered optical sensor and sensing circuit which detects movement of the impactor solenoid's plunger. FIG. 4A shows how an optical sensing path 445 is unbroken by the impactor solenoid 403. When the impactor solenoid 403 fires, as in FIG. 4B, the plunger of the impactor solenoid 403 breaks the sensing path 445 of trigger/sensor 406, which a moment later activates the secondary solenoid 402, as depicted by FIG. 4C. The platform 401 is caused to fall to position 401*a*. The events of FIGS. 4B and 4C may be substantially concurrent or just moments apart.

A time difference between actuation of the impactor solenoid 403/103 and a platform solenoid 402 of the platform release 102 may be controlled electronically, e.g. by a controller 107 which may be one or more computers or microprocessors, or manually. For instance the time lag or latency between triggering of the impactor solenoid 403/103 and the platform solenoid 402 may be accomplished by a mechanical adjustment which permits varying the relative distance between the optical sensor 406 and a dark band on the impactor's plunger, which the optical sensor detects when it moves into a sensing axis of the sensor. The photo emitter-detector pair may be mounted on a fixture (attached to the impactor solenoid) which allows adjustment along 3 axes, enabling accurate positioning of the pair, and thus reliable triggering. Latency of the platform solenoid's triggering relative to the impactor solenoid's actuation is adjustable by varying the relative distance between the photo emitter-detector pair, and the black band on the impactor solenoid's plunger. An optical sensor may be replaced with another detector type to detect when the impactor solenoid has been triggered, e.g., change in impedance, acoustic-mechanical shock, etc.

Other means of detecting energization of the impactor solenoid, and signaling the platform solenoid to actuate, are also possible. A photo-detector trigger is exemplary because of its simplicity and affordability.

Figure 5A:
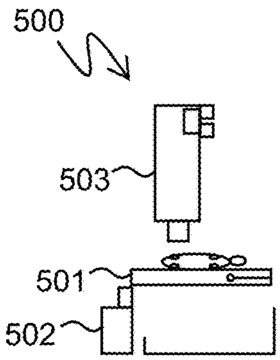
FIGS. 5A-5C show an exemplary procedure with a third embodiment. The three figures show three sequential moments in time for the same system. The events in FIGS. 5B and 5C may occur in sequence or virtually simultaneously.
Figure 5B:
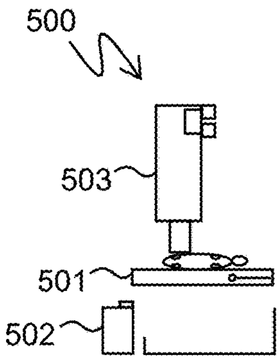
Figure 5C:
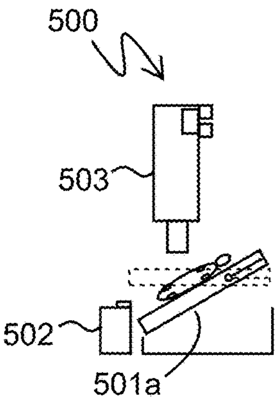

FIGS. 5A-5C show a system 500 which is yet another variation that uses the plunger of a secondary solenoid 502, either directly or by a linkage means, to maintain a starting position of platform 501 until impact. When the impactor solenoid 503 fires (FIG. 5B), the plunger of the secondary solenoid 502 fires in reverse, i.e. retracts, removing its support of the platform 501. Gravity then causes the platform 501 to fall to position 501*a*. Other arrangements for triggering the platform to fall/collapse are also possible in view of this disclosure.

Figure 6:
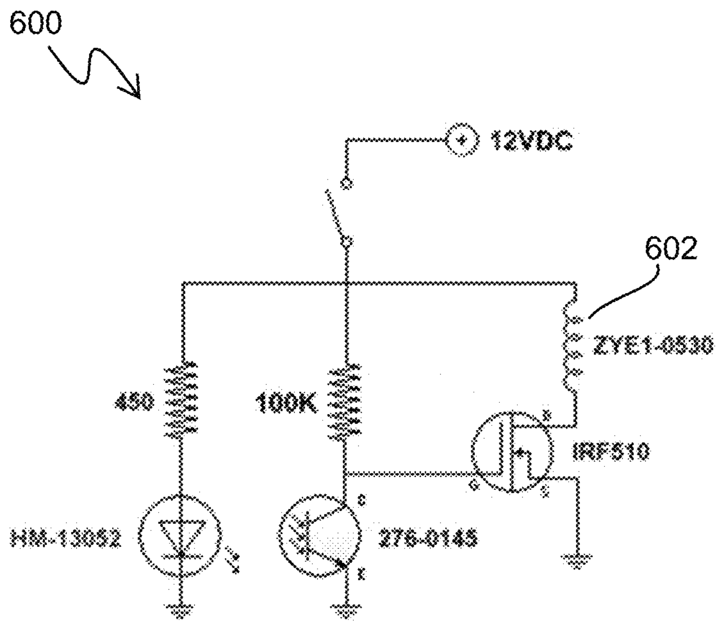
FIG. 6 is an exemplary circuit for an analog controller that times the platform release.

FIG. 6 shows a schematic for an exemplary circuit 600 for an analog controller 107 for controlling a platform release 602/102 having a platform solenoid. The platform solenoid 602 is triggered by a simple circuit which monitors movement of the impactor solenoid. A phototransistor (e.g., NPN Infrared 276-0145) is mounted on an adjustable holder in close proximity to a white light 5 mm LED (3V, 20 mA, HM-13052) which provides steady illumination of the plunger of the impactor solenoid. Current to the LED is limited by a 450 Ohm resistor. When the impactor solenoid is energized, a dark band painted around the plunger moves in front of the detector-emitter pair, reducing the light signal on the phototransistor's base. The phototransistor's collector is connected to the gate of a MOSFET (e.g., N-channel 276-2072/IRF510), and to a 100K resistor. The other side of the resistor is connected via an SPST switch to +12 VDC. One side of the platform solenoid is connected to the MOSFET's drain, and the other side via the SPST switch to +12 VDC. The MOSFET's source, and the phototransistor's emitter are at ground. The circuit is powered by a standard A/C adapter which has 12 VDC output. Other circuit designs and digital controllers 107 are possible in alternative embodiments.

As used herein, the term 'subject" refers to an organism subject to a mTBI or other injury inflicted using a system 100. The subject is typically an experimental or laboratory animal used to produce a model of a human disease or condition. The condition modeled may arise due to an injury, such as a TBI. Experimental or laboratory animals are typically mice, rats, guinea pigs, rabbits, cats, dogs, pigs, wine, mini swine, primates, chimpanzees, macaques, or any other animal that is suitable for use as a model of human disease or condition. Murine models using other rodent species are also contemplated.

All experimental designs require a control group and a test group. Thus, it is essential that all subjects or animals in each group be essentially the same and/or receive an identical treatment to reduce the number of variables between groups. The invention is particularly suited to providing a means for inducing an injury that is repeatable and replicated in each subject within an experimental group. Thus, one embodiment of the invention is a method for delivering an injury to skull, spine or other tissues of an experimental animal that can be replicated in every animal in a study. By doing so, the variations between injuries is minimized, leaving the critical variable of the experiment to be the treatment to ameliorate the injury. While the Examples of the invention disclose a replicatable mTBI, injuries to other tissues are contemplated. There are various regions of the skull or brain that may be affected by mTBI; thus, various regions of the head may be subjected to injury using the system 100. Another application that addresses profound injuries affecting humans and quality of life for those suffering such injury are injuries to the spine or spinal cord. To replicate these injuries or conditions, an injury to the spine and/or spinal cord may be delivered to groups of experimental animals. These are typically used to study regeneration of the spinal cord and preservation or restoration of motor neuron functions. However, other body parts or tissues may be similarly injured and used as experimental models. Injuries to organs, joints, and bony structures are particularly well-suited for applications of the invention.

EXAMPLES

Example 1

This Example assesses the performance of a prototype device according to this disclosure, e.g. system 100/200. Experimental results were collected using a commercially available CCI device with both the platform held still and the platform dropping away. Mice were monitored for time to establish the righting reflex as well as levels of Glial Fibrillary Acidic Protein (GFAP). Time to righting is how long post-impact it takes for a mouse to roll on to its feet and take a single step. Time-to-righting is correlated with injury severity. More severe injuries produce longer times to right. GFAP is an intermediate filament protein found in mature astrocytes which is released following astrocytic degeneration. GFAP levels have been found to highly correlate with injury severity and serum GFAP levels are used to determine injury severity in human injuries.

A Leica Impact One Impactor (Model #39463920) with a novel platform that falls upon impact was utilized. The Leica was mounted using a stereotax to control depth and location of injury. To construct the device, a plastic platform was mounted using brackets on the stereotaxic frame. The platform, on which the mouse is placed, is held steady until the moment of impact, whereupon an electromagnetic actuator forces the platform to fall. Actuation of the platform is triggered by a sensor which monitors movement of the impactor tip.

The simultaneous forces of the Lecia impactor hitting the mouse and the force imparted by the platform actuator cause the platform to drop away and the mouse to fall six inches on to the base plate. This combined force guarantees the platform will fall even when delivering ultra-mild injuries.

After each injury, blind observers using a stopwatch recorded how long it took the mice to right themselves. Righting was defined as standing on all four feet and taking a single step.

Western Blot analysis of GFAP: Brain tissue was extracted and immediately frozen on dry ice (n=4). Samples were stored in a −80° C. freezer until homogenized. The left hemisphere was placed in 1 mL of RIP A buffer on ice with Halt™ Protease and Phosphatase Inhibitor Cocktail (Thermo Fisher Scientific) at the recommended concentration of 10 pL/mL. Samples were homogenized and subsequently centrifuged at 14,000 RPM for 20 min at 4° C. and aliquoted. The BCA assay was run to determine protein concentrations. Samples were prepared using 40 pg of protein, 2.5 pL NuPAGE™ sample reducing agent Thermo Fisher Scientific), 6.25 pL LDS sample buffer, and 1× PBS for a final concentration of 25 pL. Samples were placed in a 37° C. water bath for 30 min and loaded into NuPAGE 4-12% Bis-Tris gels in MOPS running buffer. SeeBlue™ Plus2 protein ladder was used to visualize molecular weight (Thermo Fisher Scientific). The gel was run at 120V for approximately 2 h and then transferred using the iBlot 2 Transfer System with mini nitrocellulose transfer stacks (Novex). The membrane was washed with PB ST for 3 min and then blocked in 5% milk for 45 min with agitation.

Membranes were incubated with the primary antibodies at 4° C. in 2.5% milk block. GFAP was used a primary antibody (Thermo Fisher Scientific: Catalog #MA5-12023) and GapDH was used as a loading control (Thermo Fisher Scientific: Cat #MA5-15738). After primary antibody incubation, membranes were washed with PBST 3 times for 10 min each and then placed in 2.5% milk block for 30 min. Membranes were then incubated with HRP conjugated secondary antibody (1:20,000 Goat anti-rabbit Superclonal™; Thermo Fisher Scientific) and then washed with PBST 3 times for 10 min each. SuperSignal™ Westpico PLUS chemiluminescent substrate (Thermo Fisher Scientific) was used for 4 min and blots were subsequently imaged with an exposure time of 8s. Images were semi-quantified using ImageJ (NIH) by calculating adjusted relative densities of bands.

Results

Figure 7:
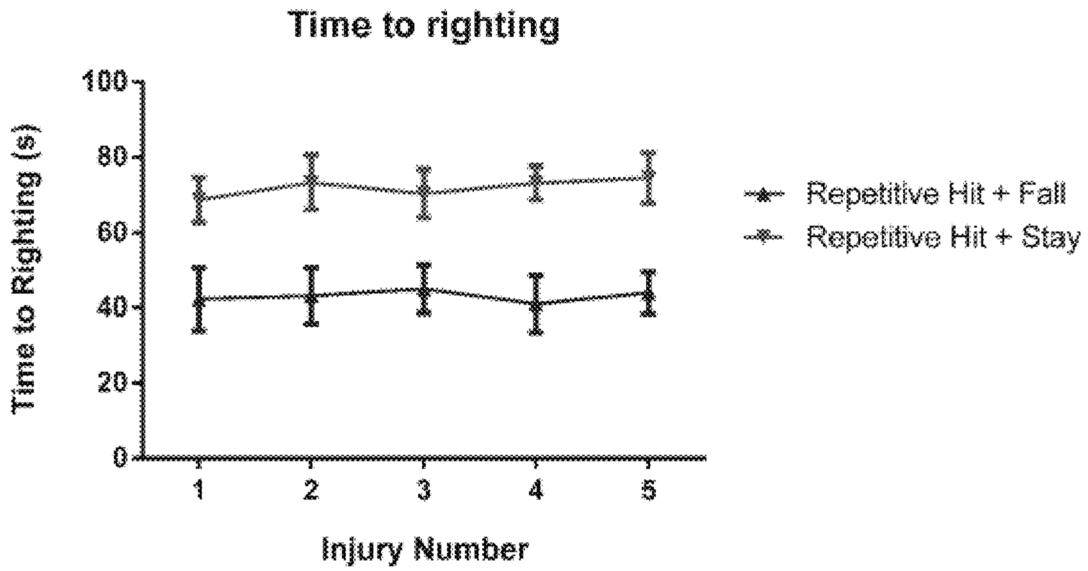
FIG. 7 is a plot showing a stationary platform causing an increase in time to righting compared to a platform that drops away.

Time to Righting: There was a significant effect of the stationary platform causing an increase in time to righting compared to the TCP-CCI ($F(1, 22)=71.540$, $p<0.001$). See FIG. 7.

Figure 8:
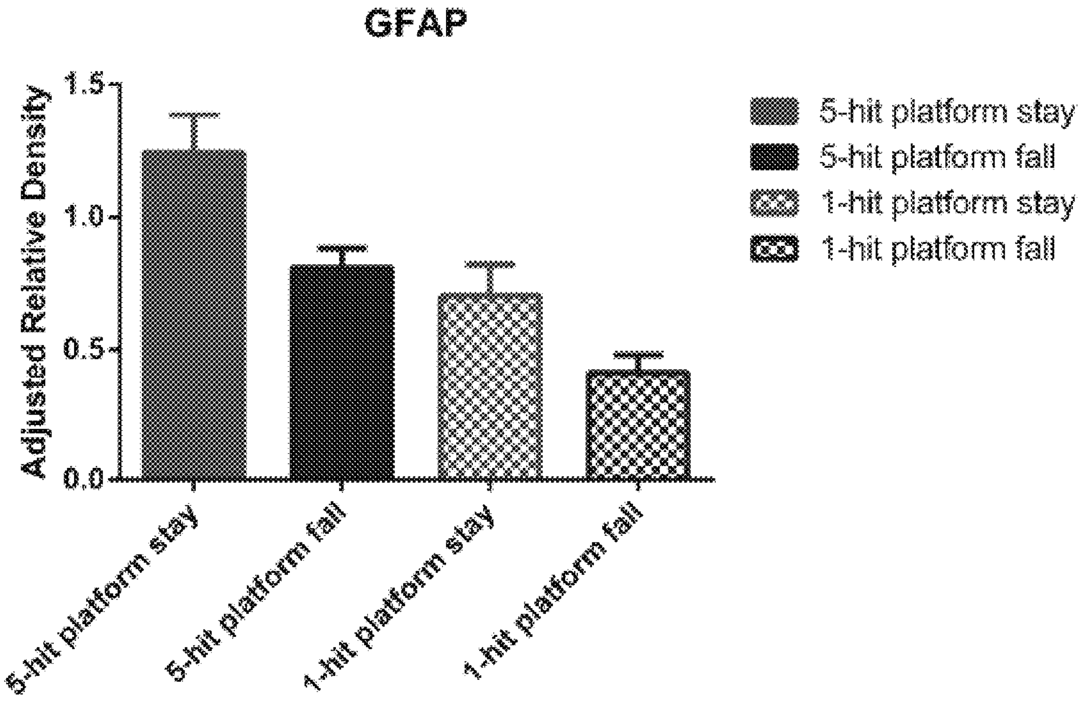
FIG. 8 is a chart of GFAP levels showing a significant increase in GFAP levels for greater numbers of injuries and for a stationary platform compared to a platform that drops away.

Glial Fibrillary Acidic Protein: Levels of GFAP were accessed via Western blot with values normalized to GapDH. There was a significant increase in levels of GFAP caused by the number of hits $F(1, 12)=19.740$, $p=0.001$, as well as a significant increase when the platform did not fall $(1, 12)=11.876$, $p=0.005$. See FIG. 8.

DISCUSSION

This Example examines the effect of a novel platform system used with a commercially available CCI device to induce mild injuries that mimic clinically relevant symptoms. The setup worked 100% of the time with the platform always falling away when the injury was induced. Furthermore, there was 0% mortality and 0% skull fracture and cranial edema after injuries were induced. Other methods of inducing TBI often produce either direct mortality or indirect mortality via skull fracture forcing euthanasia. The reliability and mild induction of injury reinforce the translation of this device for mild injuries. Mild human injuries often present with minimal-to-no post-injury unconsciousness. This is often missing from animal models which impose long periods of pre-injury anesthesia followed by long post-injury unconsciousness. Time-to-righting is often used in TBI studies to determine how severe an injury is based on how long it takes the animal to recover from injury and take its first step. In this Example, when the platform fell, the average timto-righting for mice was −40 seconds which mirrors the amount of time it takes for mice to recover from just an anesthetic. When the platform remained steady, the time-to-righting significantly increased indicating that the injury caused an extended period of unconsciousness. This finding is not surprising as the vast majority of TBI models including the Kane weight drop model cause increased time-to-righting that significantly exceeds the time-to-righting from solely anesthesia.

The tested system resulted in the production of significantly less GFAP than the device with the constant stationary platform. There was also a significant effect of number of injuries causing an increase in GFAP which is to be expected as subsequent injuries have been found to increase GFAP. Reduced GFAP levels following injury indicate that the tested system produced less severe injuries than traditional CCI injuries which, even without a craniotomy, produce higher levels of GFAP.

The significant reduction in time-to-righting and GFAP indicate that this system allows for CCI devices to induce injuries that translationally duplicate the injuries found in many human clinical cases of mild TBI. CCI devices are used in many research labs throughout the world, with numerous attempts made to reduce injury severity while retaining reliability and reproducibility. Given that the majority of all human injuries are mild injuries that produce little-to-no unconsciousness, this system will further both basic and therapeutic interventions by researchers.

Example 2

A mTBI is the most common TBI that affects U.S. military members. The military population is at risk for repeated subconcussive injuries as they navigate through combat environments, resulting in repetitive mTBI (rmTBI). These rmTBIs can produce long-term cognitive and behavioral deficits, which tend to be exacerbated by the high stress experienced by soldiers. In addition to mTBI and rmTBI, chronic stress has also been documented to correlate with damaging neurological effects.

This example includes a comparison of zinc-treated to vehicle-treated animals. Zinc is an essential mineral for healthy brain development. Previous research suggests that zinc imbalances play a role in neurodegenerative diseases. Prophylactic zinc supplementation has been shown to be a possible neuroprotective agent for adverse TBI effects. This study examined the therapeutic effect of zinc on chronic stress and rmTBI, using a system 100 to produce test groups having uniform injuries.

Subjects were C57Bl/6J wild-type mice that were 6 weeks of age at the time of the first stressor. All mice received rmTBI delivered using a system 100/200. Table 1 shows the test groups in this Example of the invention.

TABLE 1

Study groups of mice.

| | STRESSED | NON-STRESSED |
|---|---|---|
| ZINC | n = 11 | n = 10 |
| VEHICLE | n = 11 | n = 11 |

For 7 days, stress groups were subject to a rotation of varied stressors, including:

1. Deprivation of food, water, and enrichment for 8 hours.
2. Exposure to soiled rat bedding in home cage.
3. Exposure to bobcat urine in home cage.
4. Forced swim in ice bath for 5 minutes.
5. Home cage flooded with water.
6. Home cage placed on orbital shaker for 5 minutes.
7. Loud static noise for 1 hour.
8. Restraint in conical Falcon tube for 1 hour.

A second week of varied stressors was administered concurrently with rmTBI. The rmTBI closed-head injury was induced by Leica One Controlled Cortical Impact device with falling platform as in system 100, causing the mouse to rotate upon impact. Anesthetized mice received one mTBI every 48 hours over the course of 7 days for a total of 4 injuries. Immediately following injury, mice were intranasally administered either zinc treatment or vehicle control (water).

Changes in behavior were also analyzed, using the Morris Water Maze assessment for spatial memory over 7 days. In this measure of learning and memory, the mouse is tested for the ability to locate a platform in a pool of water using visual cues. Days 1-6 had 3 trials, and days 2, 4 and 6 used a hidden platform for trial 3. Day 7 comprised a 24-hr probe trial.

Results

Figure 9:
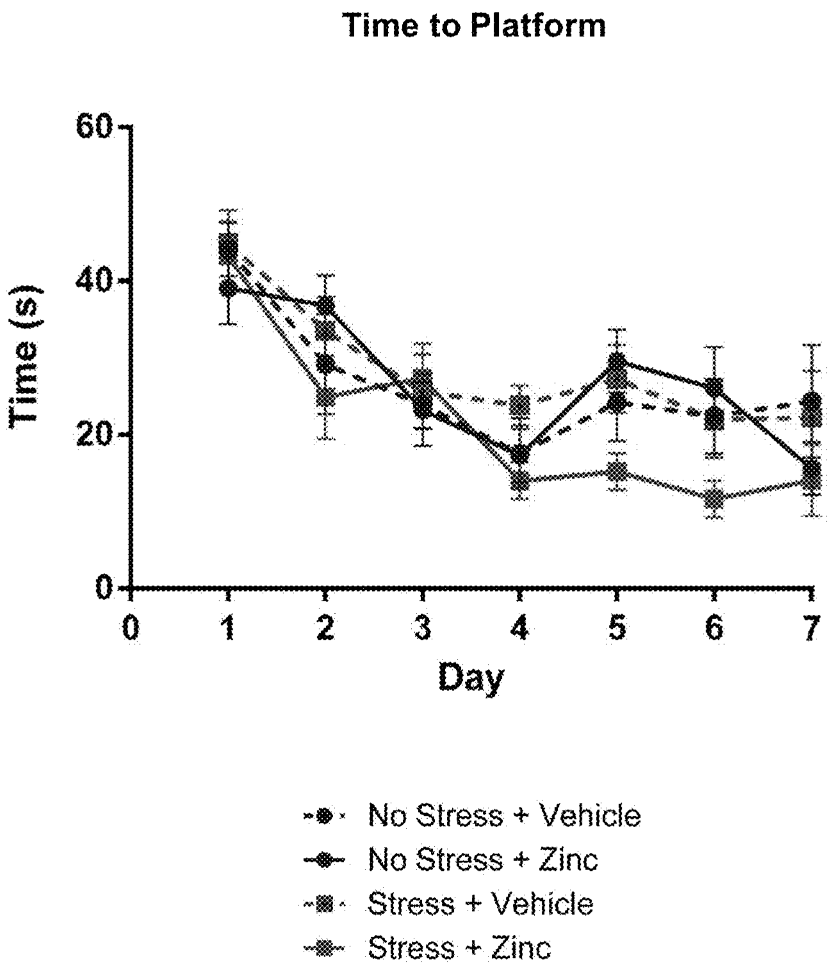
FIG. 9 shows time for mice to find a platform in a Morris water maze as a test of spatial memory.

The results in FIG. 9 show that rmTBI mice had decreased latency in locating the maze platform over multiple days of training, $F(1,39)=16.69$, $p=0.00$, demonstrating spatial learning. However, time to locate the platform did not significantly differ between stressed and non-stressed mice, $F(1,39)=0.549$, $p=0.463$. Latency times also did not differ between mice with zinc treatment and the vehicle control, $F(1,39)=2.184$, $p=0.147$. No interaction was found between stress and zinc, $F(1,39)=2.563$, $p=0.117$.

Figure 10:
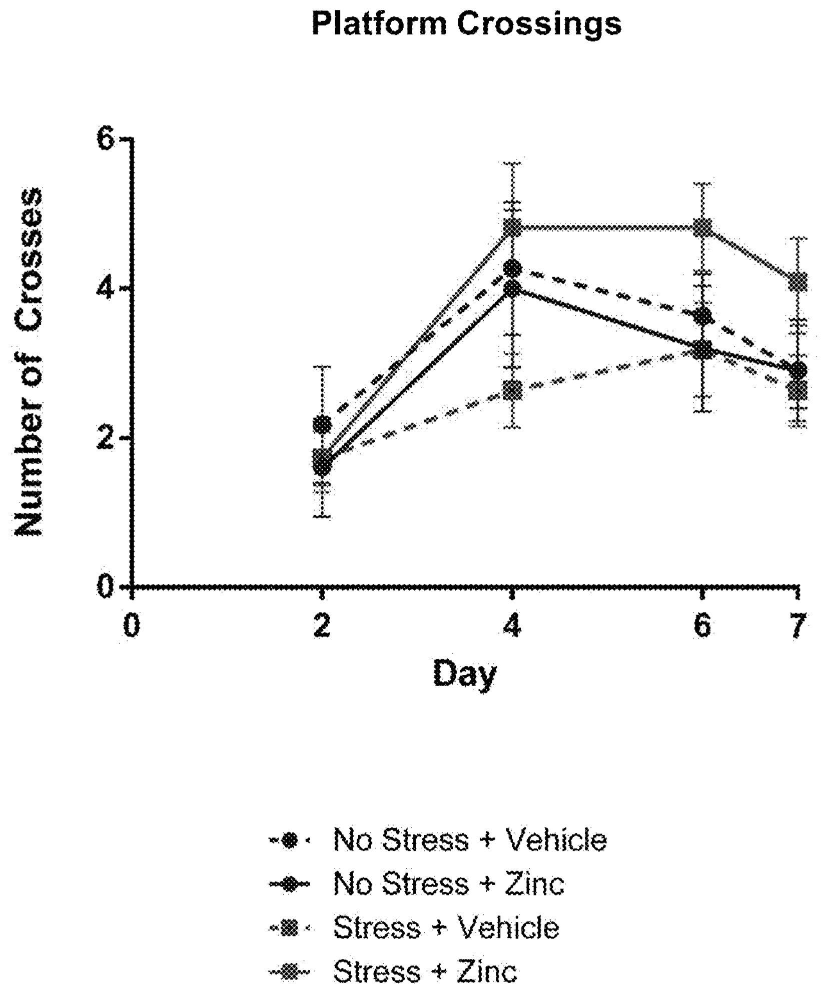
FIG. 10 shows the number of platform crossings in a Morris water maze.

As illustrated in FIG. 10, rmTBI mice showed increased number of platform crossings, $F(1,39)=9.478$, $p=0.00$, demonstrating spatial memory ability (note the difference between the Day 2 and Day 4). There was a significant interaction between stress and zinc, $F(1,39)=4.207$, $p=0.047$, as zinc treatment significantly increased the number of crossings but only for stressed mice.

Figure 11:
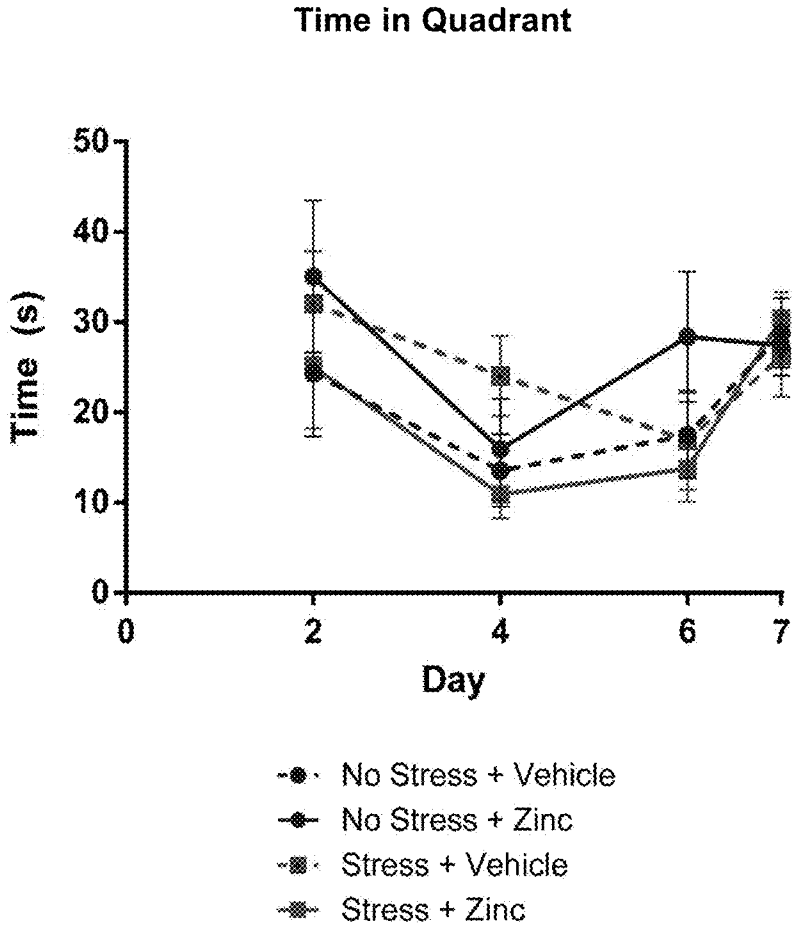
FIG. 11 shows the time spent in the quadrant of the maze where the platform was present in a Morris water maze.

Toward the end of the 7-day testing period, rmTBI mice showed significant increases in the amount of time spent in the quadrant of the maze where the platform was present, $F(1,39)=6.124$, $p=0.00$, indicating spatial learning, as shown in FIG. 11. There was a trending interaction between stress and zinc $F(1,39)=4.002$, $p=0.052$. On day 6, zinc treatment had a beneficial effect for non-stressed mice only.

Figure 12:
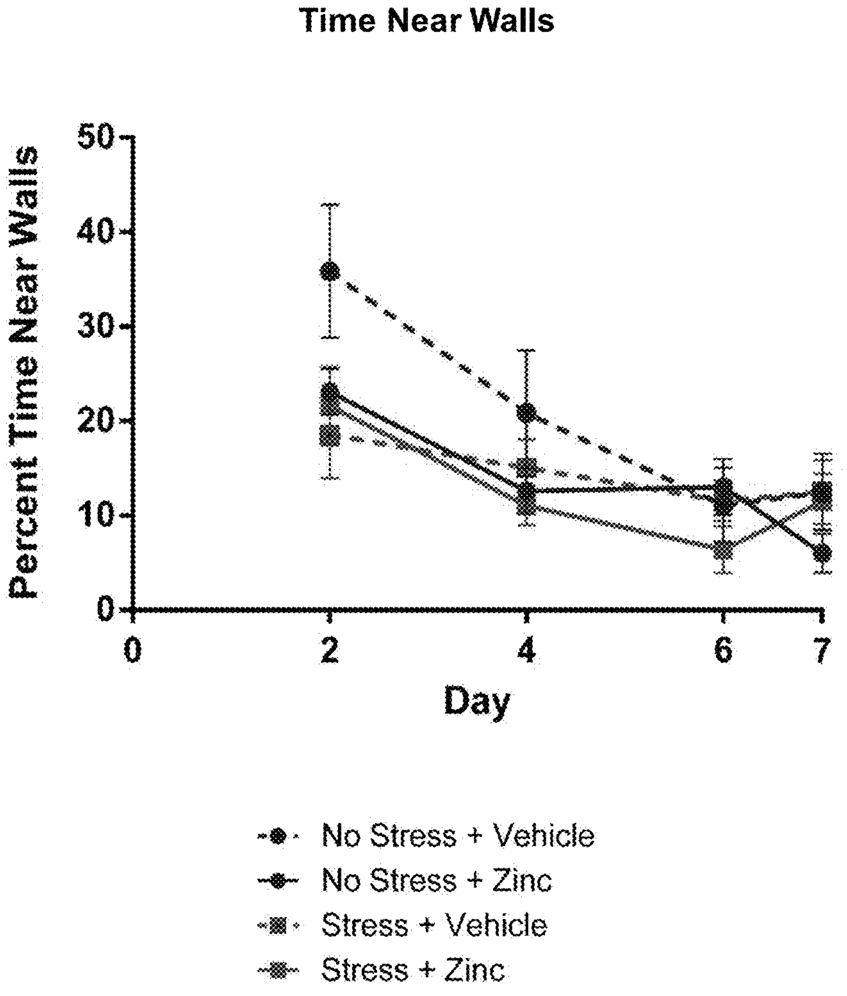
FIG. 12 shows the time spent near walls of a Morris water maze.

FIG. 12 demonstrates that rmTBI mice showed a decrease in time spent near walls with each subsequent day, $F(1,39)=16.053$, $p=0.00$, as a possible index of reduced anxiety and increased problem-solving. There was a significant within-subject stress by day linear contrast $F(1,39)=4.583$, $p=0.039$, as non-stressed mice showed more wall-seeking behavior than stressed mice.

DISCUSSION

Stressed mice with rmTBI spent significantly less time near the walls of the pool when compared with non-stressed mice. This could be attributed to the stressed mice having repeated prior exposure to a stressor that required swimming in an ice bath, which would allow these mice to develop an adaptive response to an otherwise stressful environment, whereas non-stressed mice would show increased anxiety in the novel environment. Stress did not appear to affect latency to find a hidden platform in Morris water maze, suggesting that spatial memory is not compromised by chronic variable stress Between stressed and non-stressed groups, zinc intervention was shown to contrast with the vehicle control. A trending zinc by stress interaction showed non-stressed mice who were administered zinc treatment spending more time in the target quadrant of the maze on the last day of training, suggesting post-injury zinc treatment may augment spatial memory, but compounding pre-injury stress with rmTBI may counteract therapeutic benefits. However, post-injury zinc treatment led to a significant increase in the number of platform crossings in stressed mice—this may be due to small doses of zinc showing an effect of increased locomotor activity in rodents, as the greatest slopes in platform crossings between Day 2 and Day 4 are seen in the zinc treatment groups. Both TBI and zinc have been documented to potentially cause loss of olfaction, which may impair the ability to navigate through a spatial environment in mice, e.g., Morris water maze.

Importantly, this Example demonstrates that mTBI, and more particularly, rmTBI induced using the system 100 provided a uniform and repeatable injury throughout the groups of test animals. The data obtained from tests of the rmTBI-injured animals allowed differentiation of the results to a degree where statistical significance could be identified between the groups in a predictable and repeatable manner, even when trying to tease out slight differences between groups based on behavioral parameters.

While exemplary embodiments of the present invention have been disclosed herein, one skilled in the art will recognize that various changes and modifications may be made without departing from the scope of the invention as defined by the following claims.

What is claimed is:

1. A device, comprising:
- a platform for supporting a subject;
- an impactor solenoid configured to contact the subject or a mount configured to receive the impactor solenoid;
- a platform release configured to cause at least one side of the platform to fall upon satisfaction of one or more predetermined conditions;
- wherein at least one of the one or more predetermined conditions is actuation of the impactor solenoid, and
- wherein the platform release comprises one or more magnets, and wherein the one or more conditions includes a force above a predetermined threshold transferred to the platform through the subject.

2. The device of claim 1, wherein the magnetic force of the one or more magnets acting on the platform to hold the platform level is adjustable.

3. The device of claim 1, wherein the platform release is a second solenoid.

4. The device of claim 3, wherein the second solenoid contacts the platform to cause its rotation about an axis upon satisfaction of the one or more predetermined conditions.

5. The device of claim 3, wherein the second solenoid is configured to
- support the platform to hold the platform level prior to satisfaction of the one or more predetermined conditions, and
- withdraw support of the platform upon satisfaction of the one or more predetermined conditions.

6. The device of claim 1, further comprising a trigger which synchronizes timing of actuation of the platform release with the impactor solenoid.

7. The device of claim 6, wherein the trigger is a light sensor configured to detect a lighting change caused by movement of a plunger of the impactor solenoid toward the subject.

8. A method, comprising
- supporting a subject on a platform;
- impacting the subject to induce an injury; and
- causing at least one side of the platform to fall upon satisfaction of one or more predetermined conditions,
- wherein at least one of the one or more predetermined conditions is occurrence of the impaction step, and
- wherein the causing step is performed by a platform release comprising one or more magnets, and wherein the one or more conditions includes a force above a predetermined threshold transferred to the platform through the subject that exceeds a magnetic holding force of the one or more magnets.

9. The method of claim 8, further comprising adjusting the magnetic holding force which holds the platform level.

10. The method of claim 8, wherein the causing step is performed by a platform release that comprises a second solenoid.

11. The method of claim 10, wherein the second solenoid contacts the platform to cause its rotation about an axis upon satisfaction of the one or more predetermined conditions.

12. The method of claim 10, further comprising
- supporting the platform with the second solenoid prior to satisfaction of the one or more predetermined conditions, and
- withdrawing support of the platform upon satisfaction of the one or more predetermined conditions.

13. The method of claim 8, further comprising synchronizing timing of the causing step with impacting step.

14. The method of claim 8, wherein the synchronizing is performed with a light sensor that detects a lighting change caused by movement of a plunger of the impactor solenoid toward the subject.

15. A device, comprising:
- a platform for supporting a subject, wherein the platform has an axis of rotation;
- an impactor solenoid configured to contact the subject or a mount configured to receive the impactor solenoid; and
- a platform release configured to cause at least one side of the platform to fall upon satisfaction of one or more predetermined conditions; and
- wherein:
  - at least one of the one or more predetermined conditions is actuation of the impactor solenoid; and
  - when the subject is statically positioned with respect to the platform, a distance between a predetermined point of impact of the subject and the axis of rotation of the platform is adjustable.

* * * * *